(12) United States Patent
Son et al.

(10) Patent No.: US 7,532,459 B2
(45) Date of Patent: May 12, 2009

(54) HINGE APPARATUS AND PORTABLE TERMINAL HAVING THE SAME

(75) Inventors: Ki-Bok Son, Gumi-si (KR); Sung-Ill Kang, Gumi-si (KR); Yoo-Sug Yoon, Seoul (KR); Jae-Il Seo, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 431 days.

(21) Appl. No.: 11/357,185

(22) Filed: Feb. 21, 2006

(65) Prior Publication Data
US 2006/0238962 A1 Oct. 26, 2006

(30) Foreign Application Priority Data

Apr. 22, 2005 (KR) .................. 10-2005-0033548
May 26, 2005 (KR) .................. 10-2005-0044542

(51) Int. Cl.
  *H05K 7/16* (2006.01)
(52) U.S. Cl. .................. 361/679; 16/367; 455/575.3
(58) Field of Classification Search .................. 361/679; 455/575.3; 16/367
  See application file for complete search history.

(56) References Cited

U.S. PATENT DOCUMENTS

| 6,728,557 | B1 | 4/2004 | Tracy et al. | |
| 6,941,618 | B2* | 9/2005 | Kim | 16/337 |
| 7,150,075 | B2* | 12/2006 | Kato | 16/367 |
| 2002/0177464 | A1 | 11/2002 | Swerup et al. | |
| 2005/0090296 | A1* | 4/2005 | Gordecki | 455/575.3 |
| 2005/0091431 | A1 | 4/2005 | Olodortf et al. | |
| 2005/0138774 | A1 | 6/2005 | Gan | |
| 2006/0135225 | A1* | 6/2006 | Lin et al. | 455/575.3 |

FOREIGN PATENT DOCUMENTS

| CN | 1533638 A | 9/2004 |
| KR | 20050016236 A | 2/2005 |
| TW | 249 424 | 11/2004 |
| TW | M251438 | 11/2004 |
| WO | WO-03/100999 | 12/2003 |

\* cited by examiner

*Primary Examiner*—Lisa Lea-Edmonds
*Assistant Examiner*—Ingrid Wright
(74) *Attorney, Agent, or Firm*—Roylance, Abrams, Berdo & Goodman, L.L.P.

(57) ABSTRACT

A hinge apparatus and a portable terminal are provided including a pair of housings configured to open or close and one of the housings is positioned in parallel with a side of the other to rotate the portable terminal about 90° according to user preference. Thus, the user can enjoy the horizontal view of a screen of a display device. Consequently, the user can conveniently watch the screen provided through a multimedia service. The hinge apparatus that rotates a housing such that the housing is positioned in parallel with a side of the other housing provides a driving force exerted in a direction that is the same as or opposite to a direction the housing rotates to implement a semi-automatic operation and provide user convenience.

40 Claims, 12 Drawing Sheets

HINGE APPARATUS AND PORTABLE TERMINAL HAVING THE SAME

PRIORITY

This application claims the benefit under 35 U.S.C. § 119(a) of the application entitled "Hinge Apparatus and Portable Terminal Having the Same" filed in the Korean Intellectual Property Office on Apr. 22, 2005 and assigned Serial No. 2005-33548 and an application entitled "Hinge Apparatus and Portable Terminal Having the Same" filed in the Korean Intellectual Property Office on May 26, 2005 and assigned Serial No. 2005-44542, the entire contents of both of which are hereby incorporated by reference.

BACKGROUND OF THE INVENTION

1. Field of the Invention

The present invention generally relates to a portable terminal. More particularly, the present invention relates to a hinge apparatus in which a pair of hinge axes allow opening/closing of a folder-type terminal and a housing which is rotated to be positioned in parallel with a side of the other housing and a portable terminal having the hinge apparatus.

2. Description of the Related Art

Generally, a "portable terminal" refers to an electronic apparatus which provides electrical communication between users and service providers. Various applications such as voice communication, a short message service, a mobile banking service, TV watching, an on-line game service, and an on-demand video service are provided to users using portable terminals.

Conventional portable terminals may be classified in various types according to their appearance. For example, portable communication terminals are classified into bar-type terminals, flip-type terminals, and folder-type terminals according to their appearance. In the bar-type terminal, input/output devices such as a communication circuit, a transmitting unit, and a receiving unit are mounted in a single housing. In the flip-type terminal, a flip cover is mounted in the bar-type terminal. In the folder-type terminal, a pair of housings are opened and closed through rotation and input/output devices are properly arranged over the pair of housings. Recently, a sliding-type terminal has been developed to improve portability and convenience in use and satisfy various user preferences together with the folder-type terminal.

Mobile communication services using portable terminals have been diversified, such as music videos, games, video on demand (VOD), and digital mobile broadcasting. However, since a display device of a portable terminal is often manufactured to have a greater length than width, a screen provided by a multimedia service cannot be implemented suitable for the aspect ratio of the display device. Moreover, even when a screen suitable for the aspect ratio of the display device is displayed on the display device, if a portable terminal is rotated, the display device is positioned horizontally. As a result, the user often cannot comfortably watch the screen. In addition, even if the portable terminal is configured such that only the display device can rotate, the user may feel inconvenience in manipulating the portable terminal.

Accordingly, there is a need for a hinge apparatus in which a screen provided by a multimedia service such as video on demand (VOD) and digital mobile broadcasting is implemented suitable for the aspect ratio of a display device.

SUMMARY OF THE INVENTION

An aspect of the present invention is to address at least the above problems and/or disadvantages and to provide at least the advantages described below. Accordingly, an aspect of the present invention is to provide a hinge apparatus in which a screen provided by a multimedia service such as video on demand (VOD) and digital mobile broadcasting is, implemented suitable for the aspect ratio of a display device and a user can comfortably watch the screen, and a portable terminal having the hinge apparatus.

Another aspect of the present invention is to provide a portable terminal including a rotation restrictor, in which a pair of housings are rotatably combined with each other such that the housings rotate with respect to a first axis and a second axis, respectively. When a user desires to rotate one of the housings with respect to the first hinge axis, movement with respect to the second hinge axis is restricted, thereby implementing stable opening/closing operations.

To achieve the above and other objects, there is provided a portable terminal including a first housing and a second housing which rotates in a direction towards or away from the first housing while rotating with respect to a first hinge axis. The second housing is rotatably combined with the first housing such that the second housing rotates with respect to a second hinge axis which extends perpendicularly to the first hinge axis. A hinge apparatus is connected with the first housing and the second housing. The hinge apparatus includes a hinge housing positioned on the first housing and which extends in the direction of the second hinge axis. A hinge shaft is connected with the hinge housing and extends in the direction of the second hinge axis to rotate with respect to the second hinge axis. A hinge cap is fixed on the hinge shaft and rotates with respect to the second hinge axis. A third housing is provided to surround at least a portion of the hinge housing and the hinge cap and rotates with respect to the second hinge axis along with the hinge cap. The second housing is combined with the third housing and rotates with respect to the first hinge axis. The second housing is positioned in parallel with one side of the first housing as the third housing rotates with respect to the second hinge axis when the second housing rotates in the direction away from the first housing.

To achieve the above and other objects, there is also provided a portable terminal including a first housing and a second housing which rotates in a direction toward or away from the first housing while rotating with respect to a first hinge axis and rotatably connected with the first housing such that the second housing rotates with respect to a second hinge axis which extends perpendicularly to the first hinge axis. A hinge apparatus is connects the first housing and the second housing. The portable terminal includes a resting groove formed in a face of the first housing. A third housing is provided in the hinge apparatus and extends in the direction of the first hinge axis, positioned on the resting groove, and is rotatably combined such that the second housing rotates with respect to the first hinge axis. One end of the third housing is combined with the first housing and rotates with respect to the second hinge axis on the second hinge housing. As the third housing rotates with respect to the second hinge axis, when the second housing rotates in the direction away from the first housing, the second housing is positioned in parallel with one side of the first housing.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF THE EXEMPLARY EMBODIMENTS

The matters defined in the description such as a detailed construction and elements are provided to assist in a comprehensive understanding of the exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
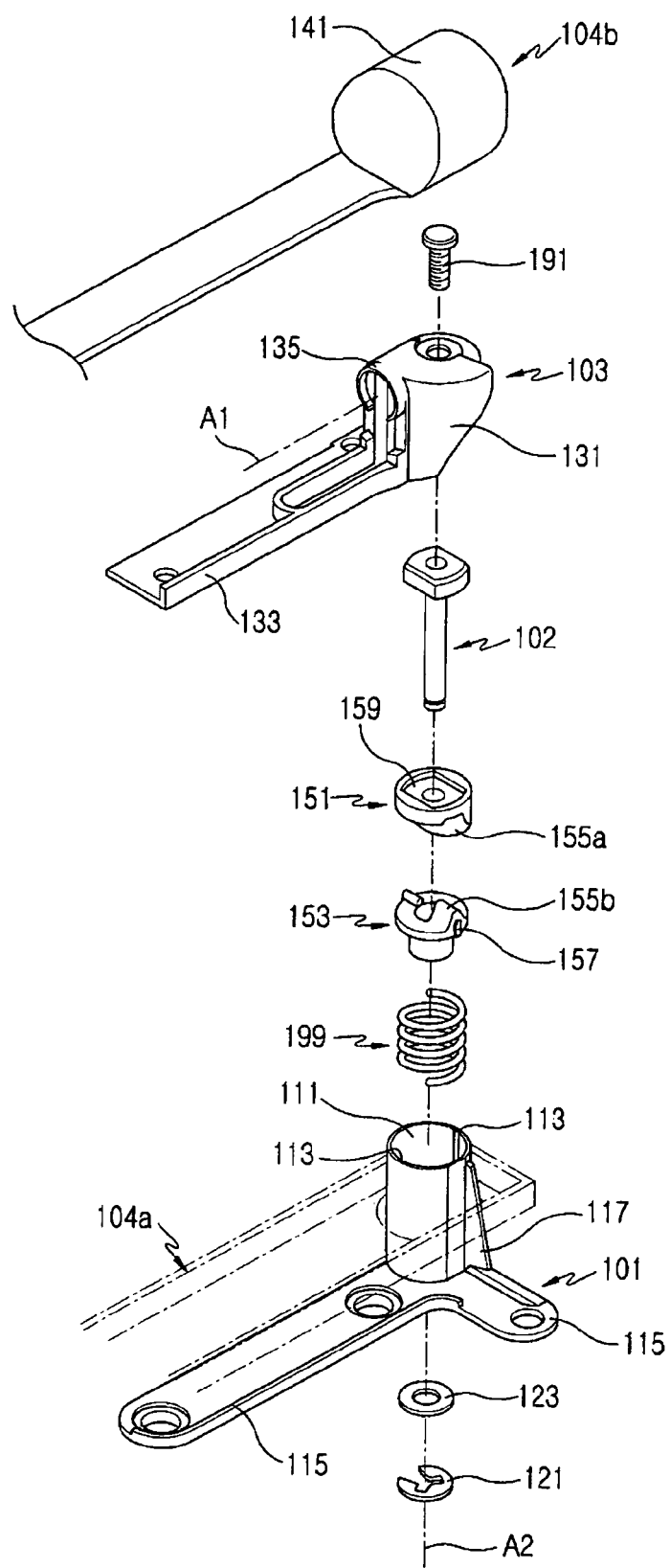
FIG. 1 is an exploded perspective view of a hinge apparatus according to a first exemplary embodiment of the present invention.
Figure 2:
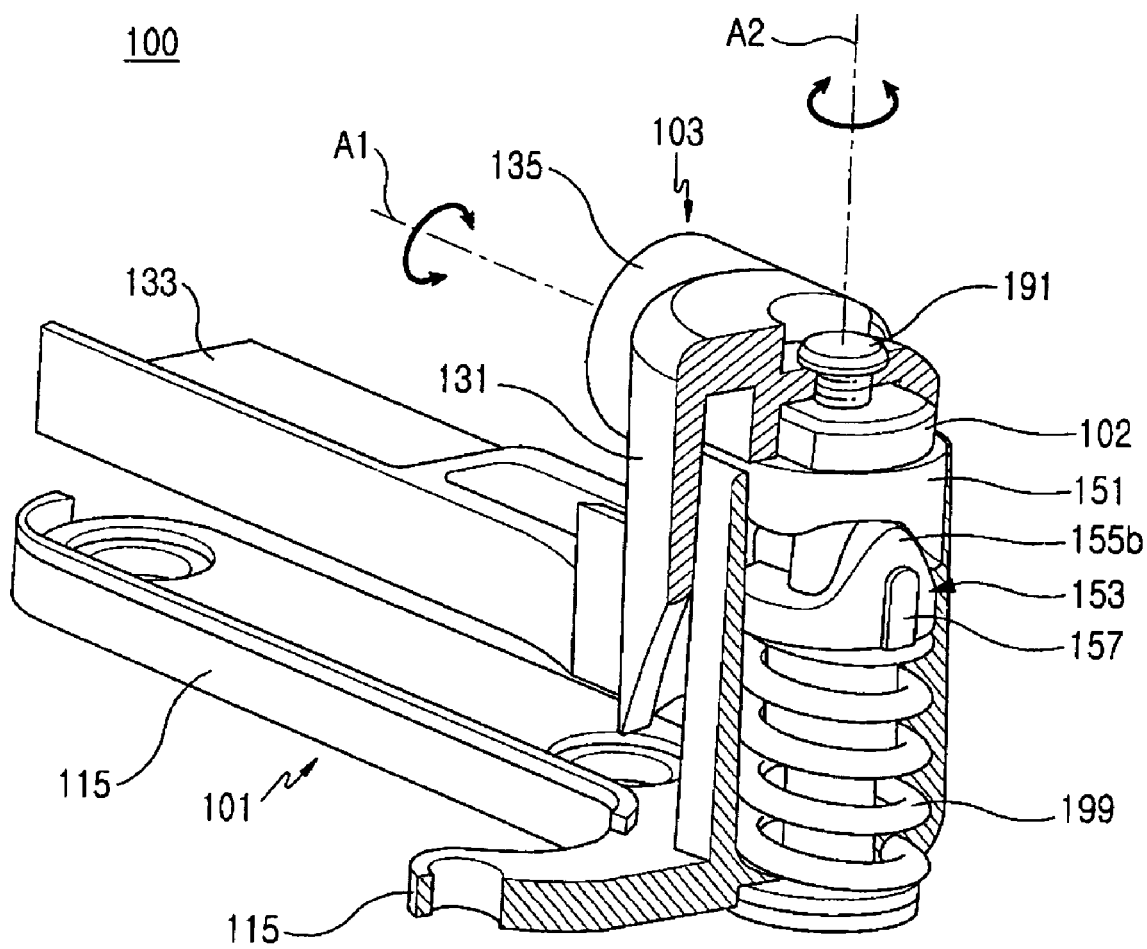
FIG. 2 is an assembled perspective view in partial cross-section of the hinge apparatus of FIG. 1.
Figure 6:
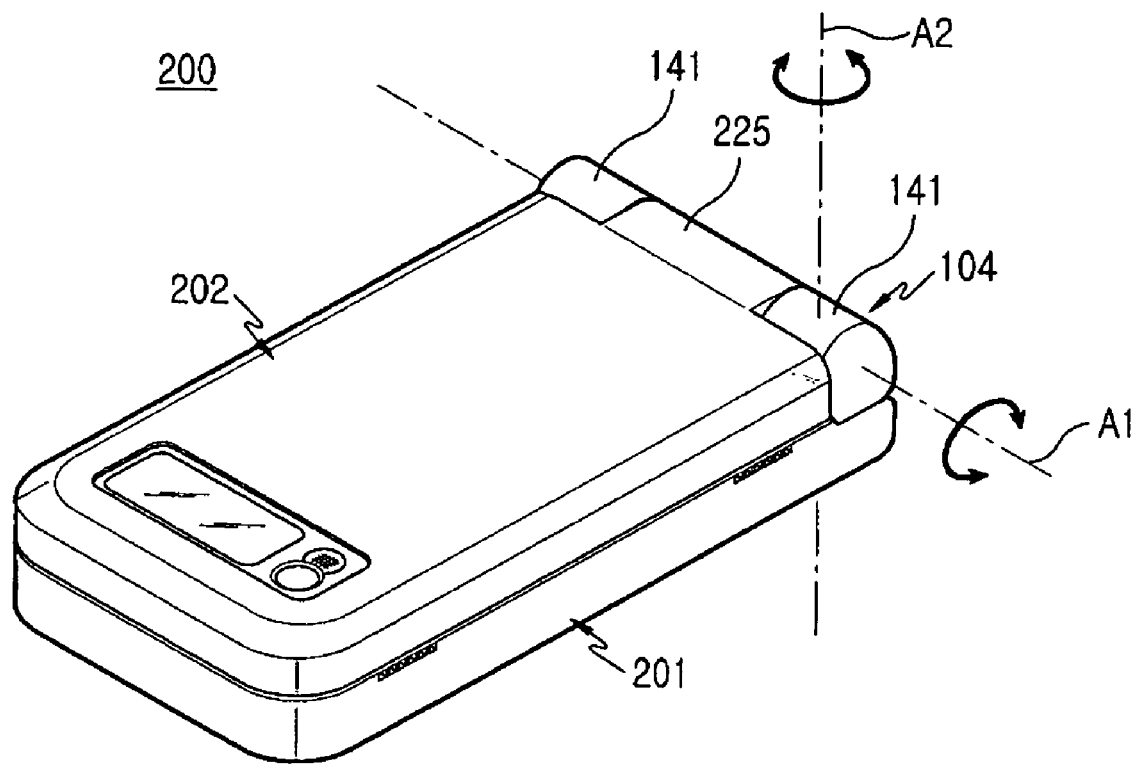
FIG. 6 is a perspective view of a portable terminal having the hinge apparatus of FIG. 1.

As shown in FIGS. 1 and 2, a hinge apparatus 100 of a portable terminal according to a first exemplary embodiment of the present invention includes a hinge housing 101, a hinge shaft 102, a hinge cap 103, and a third housing (see 104 of FIG. 6). A first hinge axis A1 extends in a first direction and a second hinge axis A2 extends perpendicularly to the first hinge axis A1. The third housing 104 accommodates the hinge cap 103 and constitutes a portion of the portable terminal having the hinge apparatus 100. The hinge apparatus 100 rotatably connects a pair of housings of the portable terminal. The hinge apparatus allows the first hinge axis A1 and the second hinge axis A2 to open/close. The hinge apparatus also allows positioning of one housing in parallel with one side of the other housing.

The hinge housing 101 is substantially cylindrical in shape. The hinge housing 101 extends in the direction of the second hinge axis A2 and provides an accommodating space whose one end is open and other end is closed. In the inner circumferential face of the hinge housing 101, at least one guide groove 113 extends in the direction of the second hinge axis A2 and at least one first engaging arm 115 extends from the outer circumferential face of the hinge housing 101. In FIG. 1, a pair of first engaging arms 115 intersect at about 90° at the closed end of the hinge housing 101. A stopper rib 117 is formed in the outer circumferential face of the hinge housing 101. The stopper rib 117 protrudes from the outer circumferential face of the hinge housing 101 and is connected to the first engaging arm 115 to improve structural stability. The hinge housing 101 is fixed within one of a pair of housings and includes an open end which protrudes to the outside of the housing. The first engaging arm 115 provides a member which fixes the hinge housing 101 onto a housing of the portable terminal.

The hinge shaft 102 extends in the direction of the second hinge axis A2 and protrudes to the closed end of the hinge housing 101 through the hinge housing 101. An E-ring 121 engages in the outer circumferential face of the hinge shaft 102 and protrudes to the closed end of the hinge housing 101. Thus, the hinge shaft 102 is connected with the hinge housing 101 and rotates with respect to the second hinge axis A2. A washer 123 is interposed between the end face of the hinge housing 101 and the E-ring 121 to alleviate friction that may occur therebetween.

The hinge cap 103 is positioned onto an end of the hinge shaft 102 to close the opened end of the hinge housing 101 and rotates with respect to the second hinge axis A2 together with the hinge shaft 102. The hinge cap 103 is positioning on the hinge shaft 102 by a fixing element such as a screw 191 that penetrates the hinge cap 103 from the top of the hinge cap 103 and is screwed in an end of the hinge shaft 102. The top end portion of the hinge shaft 102 is polygonal shaped and portions of the outer circumferential face of the top end portion are formed curved; however, any suitable shape or arrangement of shapes can be used. A groove (not shown) in a shape corresponding to the shape of the top end of the hinge shaft 102 is formed in the inner circumferential face of the hinge cap 103 to cause the hinge cap 103 to rotate along with the hinge shaft 102.

The hinge cap 103 includes a sleeve 131 that surrounds a portion of the outer circumferential face of the hinge housing 101. The hinge cap 103 also includes a hinge dummy 135 and a second engaging arm 133 that protrude from the outer circumferential face of the hinge cap 103 in the direction of the first hinge axis A1. The second engaging arm 133 extends in the direction of the first hinge axis A1. When the hinge cap 103 is fixed onto the hinge shaft 102, the inner circumferential face of the sleeve 131 is spaced apart from the outer circumferential face of the hinge housing 101 by a predetermined interval. When the hinge cap 103 rotates with respect to the second hinge axis A2, the sleeve 131 is interferes with the stopper rib 117 to restrict the rotation range of the hinge cap 103.

A slit (see 139 of FIG. 4) is formed in the hinge cap 103. The slit 139 extends over the second engaging arm 133, the sleeve 131, and the hinge dummy 135 and connects the inner circumferential face and the outer circumferential face of the sleeve 131.

The third housing (see 104 of FIG. 6) includes a lower case 104a and an upper case 104b. The third housing 104 extends in the direction of the first hinge axis A1 and a pair of side hinge arms 141 are formed opposite to each other at both ends of an upper portion of the third housing 104. The other of a pair of housings rotate with respect to the first hinge axis A1 while being supported by the side hinge arms 141. In other words, the side hinge arms 141 are located on the first hinge axis A1, thereby providing a hinge axis for the other housing of the portable terminal. At this time, the hinge dummy 135 may act as a for connecting member for the housings of the portable terminal, which is exposed to the inner wall of one of the side hinge arms 141 and is connected with the third housing 104.

The lower case 104a is rotatably combined on the hinge housing 101 and the upper case 104b is assembled with the lower case 104a so as to surround the hinge cap 103. The second engaging arm 133 of the hinge cap 103 is fixed in the inner wall of the third housing 104. Thus, the third housing 104 rotates with respect to the second hinge axis A2 along with the hinge cap 103. The open end of the hinge housing 101 is positioned in the inside of the third housing 104 through an end of the lower case 104a.

At this time, the inside of the housing in which the hinge housing 101 is fixed and the inside of the third housing 104 are connected through the slit 139. In other words, since the outer circumferential face of the hinge housing 101 and the inner circumferential face of the slit 139 are separated, a space therebetween is connected to the inside of the housing in which the hinge housing 101 is fixed. The outer circumferential face of the sleeve 131 is positioned within the third housing 104 and is connected to the inner circumferential face of the sleeve 131 through the slit 139. Thus, the inside of the housing in which the hinge housing 101 is connected to the inside of the third housing 104.

A first hinge cam 151, a second hinge cam 153, and an elastic member 199 are accommodated in the hinge housing 101 to generate a driving force for rotating the hinge cap 103.

Figure 5:
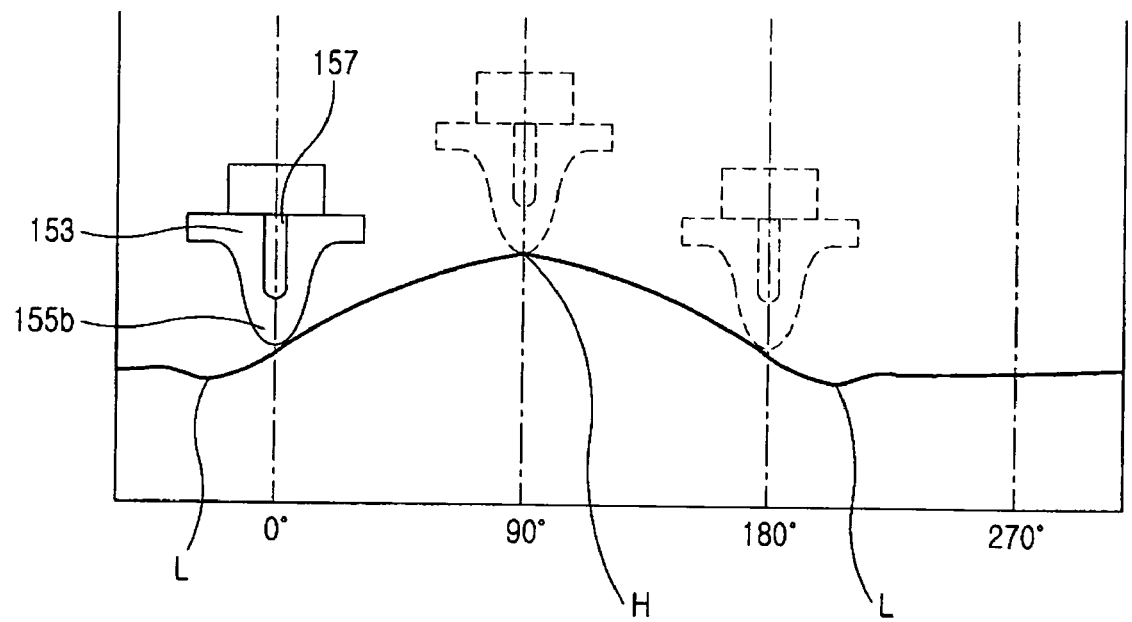
FIG. 5 is a cam curve diagram illustrating operation of hinge cams of the hinge apparatus of FIG. 1.

The first hinge cam 151 is positioned on the hinge shaft 102 and rotates with respect to the second hinge axis A2 along with the hinge shaft 102. A fixing groove 159 in a shape corresponding to the shape of the top end portion of the hinge shaft 102 is formed at one end of the first hinge cam 151. The fixing groove 159 engages the top end portion of the hinge shaft 102 and thus, the first hinge cam 151 rotates with respect to the second hinge axis A2 along with the hinge shaft 102. A first protruding portion 155a is formed at the other end of the first hinge cam 151. The first protruding portion can be any suitable shape such as dome-shaped, conically shaped, irregularly shaped, an elevated surface, or frusto-conically shaped. FIG. 5 is a cam curve diagram of the first hinge cam 151. Referring to FIG. 5, the first protruding portion 155a is formed in a range exceeding about 180° from the lowest point L of one end to the lowest point L of the other end through the highest point H along the circumference of the first hinge cam 151 and is symmetric with respect to the highest point H The second hinge cam 153 is rotatably combined on the hinge shaft 102 while facing the first hinge cam 151. A second protruding portion 155b is formed at one end of the second hinge cam 153. The second protruding portion can be any suitable shape such as dome-shaped, conically shaped, irregularly shaped, an elevated surface, or frusto-conically shaped. The second protruding portion 155b slides along and in contact with the curved surface of the first protruding portion 155a when the second hinge cam 153 rotates on the hinge shaft 102. A guide protrusion 157 which corresponds to the guide groove 113 of the hinge housing 101 is formed in the outer circumferential face of the second hinge cam 153. As the guide protrusion 157 engages in the guide groove 113 so that the guide protrusion 157 can move along a straight line, the second hinge cam 153 moves along a straight line within the hinge housing 101.

The elastic member 199 is positioned on the hinge shaft 102 and provides an elastic force exerted in a direction the second hinge cam 153. The elastic member 199 is attached to the second hinge cam 153. One end of the elastic member 199 is supported by the inner wall of the closed end of the hinge housing 101 and the other end of the elastic member 199 is supported by the other end of the second hinge cam 153 to provide an elastic force. It is preferable that a compression coil spring be used as the elastic member 199.

As the hinge shaft 102 rotates, the second protruding portion 155b slides along and in contact with the curved surface of the first protruding portion 155a in a predetermined section. At this time, since the elastic force of the elastic member 199 is exerted in a direction of the second hinge cam 153 and is attached to the first hinge cam 151, the hinge shaft 102 and the first hinge cam 151 rotate on the hinge housing 101 so that the highest point H of the second protruding portion 155b is positioned at the lowest points L of both ends of the second protruding portion 155b.

Consequently, the first hinge cam 151, the second hinge cam 153, and the elastic member 199 generate a driving force used for the hinge apparatus 100 to position the third housing 104 in a direction when the third housing 104 rotates.

Figure 3:
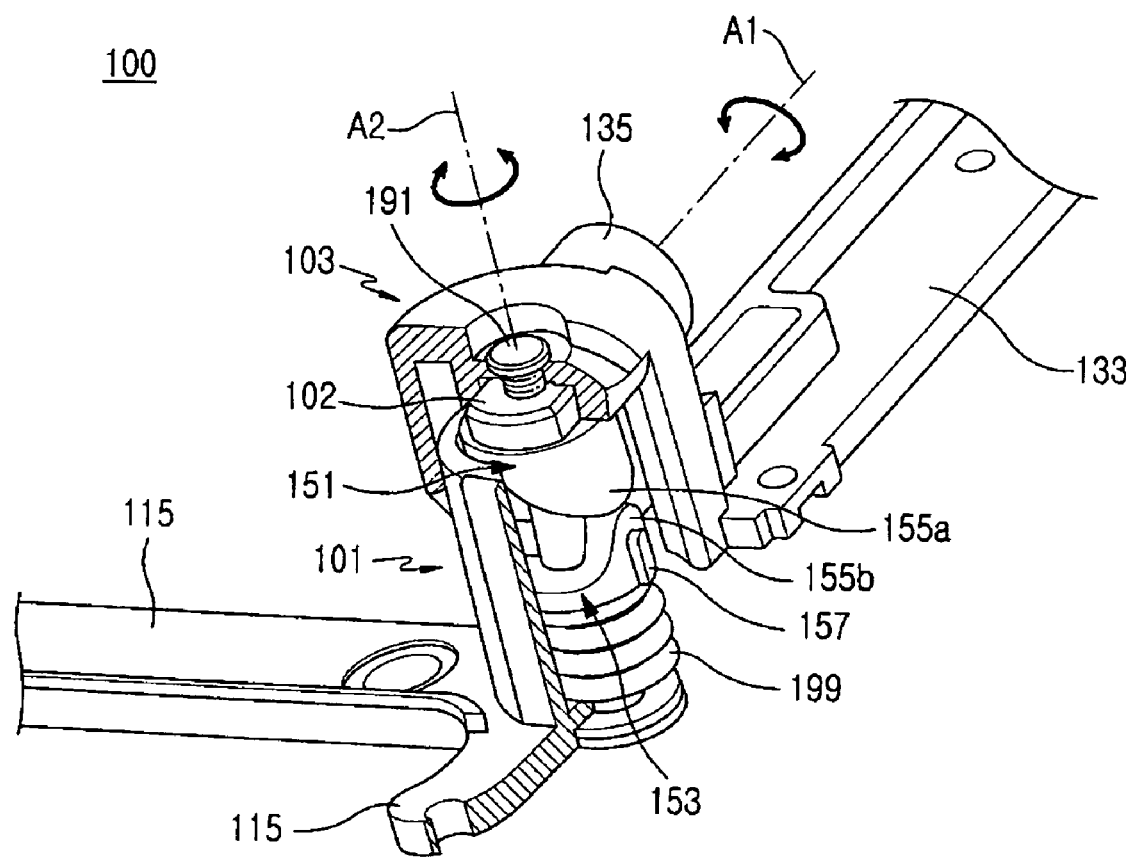
FIGS. 3 and 4 are perspective views in partial cross section sequentially showing an operation of the hinge apparatus of FIG. 1.
Figure 4:
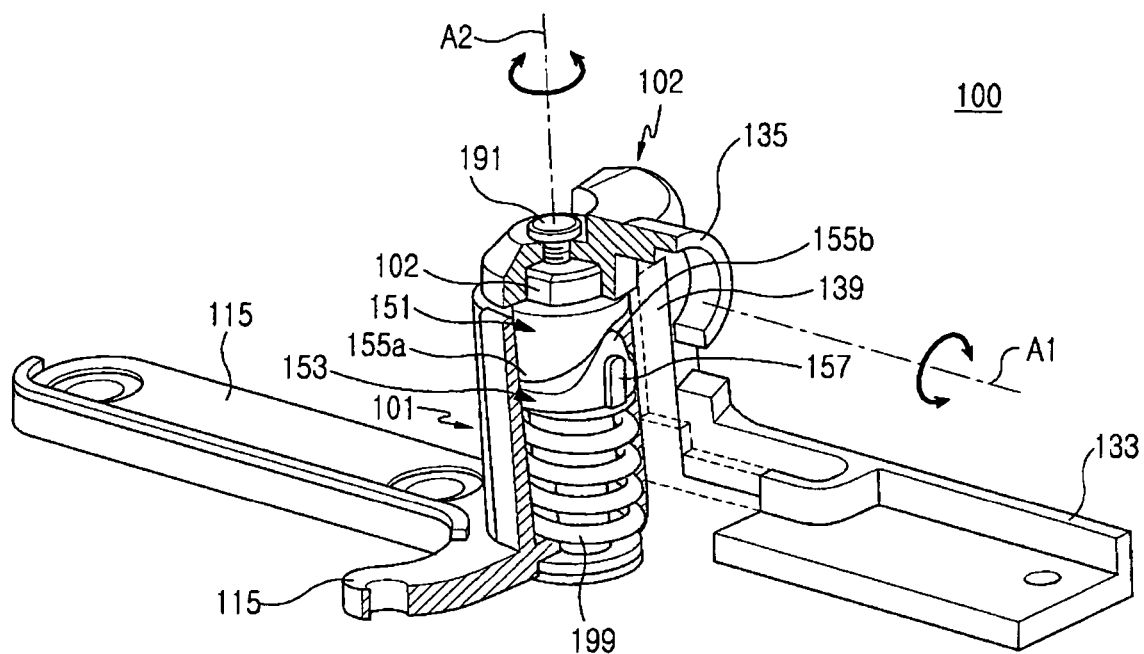

FIGS. 3 and 4 are perspective views in partial cross-section sequentially showing an operation of the hinge apparatus 100. In FIG. 3, the hinge cap 103 rotates 90° with respect to the second hinge axis A2 from an initially assembled position. Referring to FIGS. 3 and 5, the second protruding portion 155b is positioned near to the lowest point L of one end of the first protruding portion 155a in the initially assembled position, and the highest point H of the protruding portion 155b is positioned on the highest point H of the first protruding portion 155a when the hinge cap 103 rotates 90° with respect to the second hinge axis A2.

While the hinge cap 103 rotates up to 90° from the initially assembled position, the second protruding portion 155b moves along the curved surface between the lowest point L of one end of the first protruding portion 155a and the highest point H of the first protruding portion 155a. At this time, a driving force exerted in a direction the second protruding portion 155b moves back to the lowest point L of one end of the first protruding portion 155a is generated with the elastic force of the elastic member 199. Thus, the driving force exerts pressure on the first hinge cam 151 and the hinge shaft 102.

In FIG. 4, the hinge cap 103 rotates 180° from the initially assembled position. Once the second protruding portion 155b moves by 90° or more from the initially assembled position, the second protruding portion 155b slides along and in contact with the curved surface of the first protruding portion 155a from the highest point H of the first protruding portion 155a to the lowest point L of the other end of the first protruding portion 155a. At this time, a driving force exerted in a direction the second protruding portion 155b moves to the lowest point L of the other end of the first protruding portion 155a and is generated with the elastic force of the elastic member 199. The driving force exerts pressure on the first hinge cam 151 and the hinge shaft 102.

When the hinge cap 103 rotates 180° with respect to the second hinge axis A2 from the initially assembled position, the sleeve 131 is locked by the stopper rib 117, thereby restricting rotation of the hinge cap 103. At this time, as shown in FIG. 5, the second protruding portion 155b is positioned on the curved surface between the highest point H of the first protruding portion 155a and the lowest point L of the other end of the first protruding portion 155a. Thus, the hinge cap 103 can remain in a fixed state through a driving force generated by the elastic member 199 and the restriction of rotation by the sleeve 131 and the stopper rib 117.

By adjusting the range of an angle in which the first protruding portion 155a is formed, the highest point H of the second protruding portion 155b may be positioned in the lowest point L of the first protruding portion 155a when the hinge cap 103 rotates 180°. However, the hinge cap 103 should remain in a fixed state after rotating 180°.

In other words, the movement of the hinge cap 103 is restricted by a driving force generated by the first hinge cam 151, the second hinge cam 153, and the elastic member 199 even when the sleeve 131 is locked by the stopper rib 117 in the hinge apparatus 100. However, it is not necessary to maintain a state where the driving force generated by the first hinge cam 151, the second hinge cam 153, and the elastic member 199 are exerted if the hinge cap 103 can remain in a fixed state after rotating 180°.

When the hinge cap 103 rotates back to the initially assembled position after rotating 180°, the driving force of the first hinge cam 151, the second hinge cam 153, and the elastic member 199 are exerted in the same manner. In other words, when the hinge cap 103 rotates from a 180° rotated position to a 90° rotated position, a driving force in a direction the second protruding portion 155b is positioned in the lowest point L of the other end of the first protruding portion 155a is generated. When the hinge cap 103 rotates from the 90° rotated position to the initially assembled position, a driving force in a direction the second protruding portion 155b is positioned in the lowest point L of one end of the first protruding portion 155a is generated.

If there is no member for restricting rotation of the hinge cap 103 such as the sleeve 131 and the stopper rib 117, the movement range of the second protruding portion 155b may fall between the lowest points L of both ends of the first protruding portion 155a. Thus, a driving force may be generated through rotation exceeding 180° on the hinge shaft 102.

Hereinafter, a portable terminal 200 having the hinge apparatus 100 will be described with reference to FIGS. 6 through 8.

Figure 7:
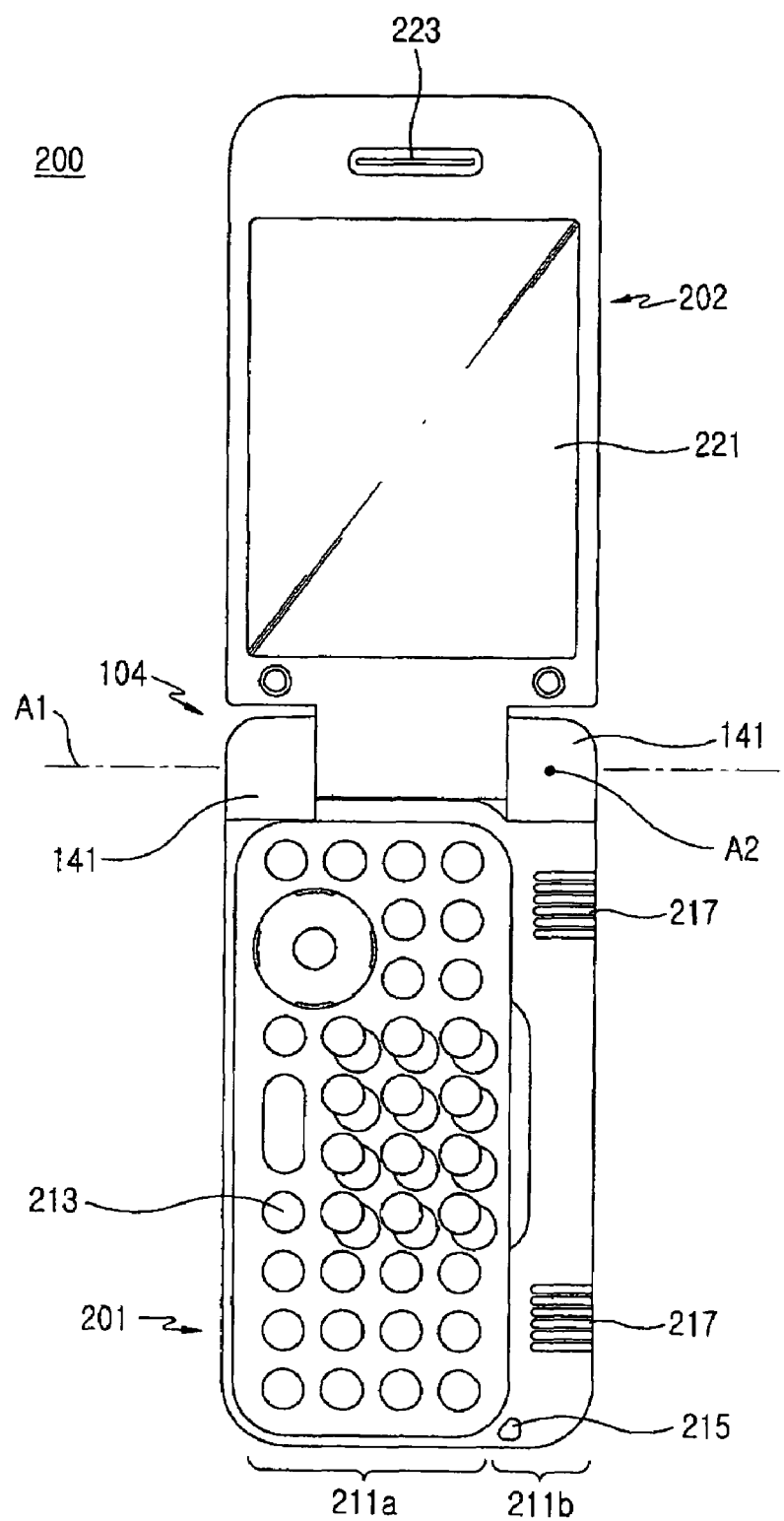
FIG. 7 is a front view showing a second housing of the portable terminal of FIG. 6 which rotates with respect to a first hinge axis.
Figure 8:
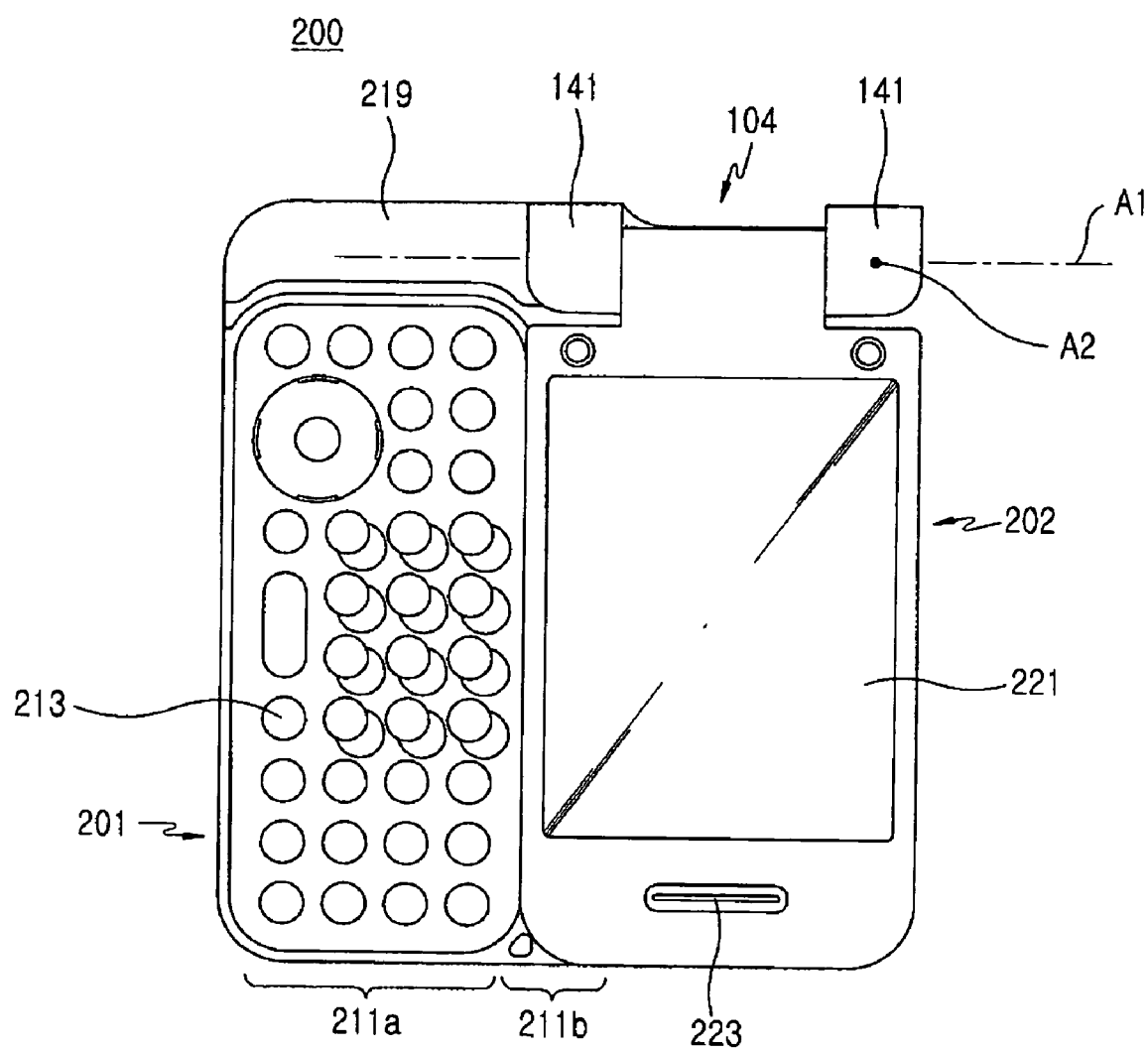
FIG. 8 is a front view showing the second housing of FIG. 7 which rotates with respect to a second hinge axis.
Figure 9:
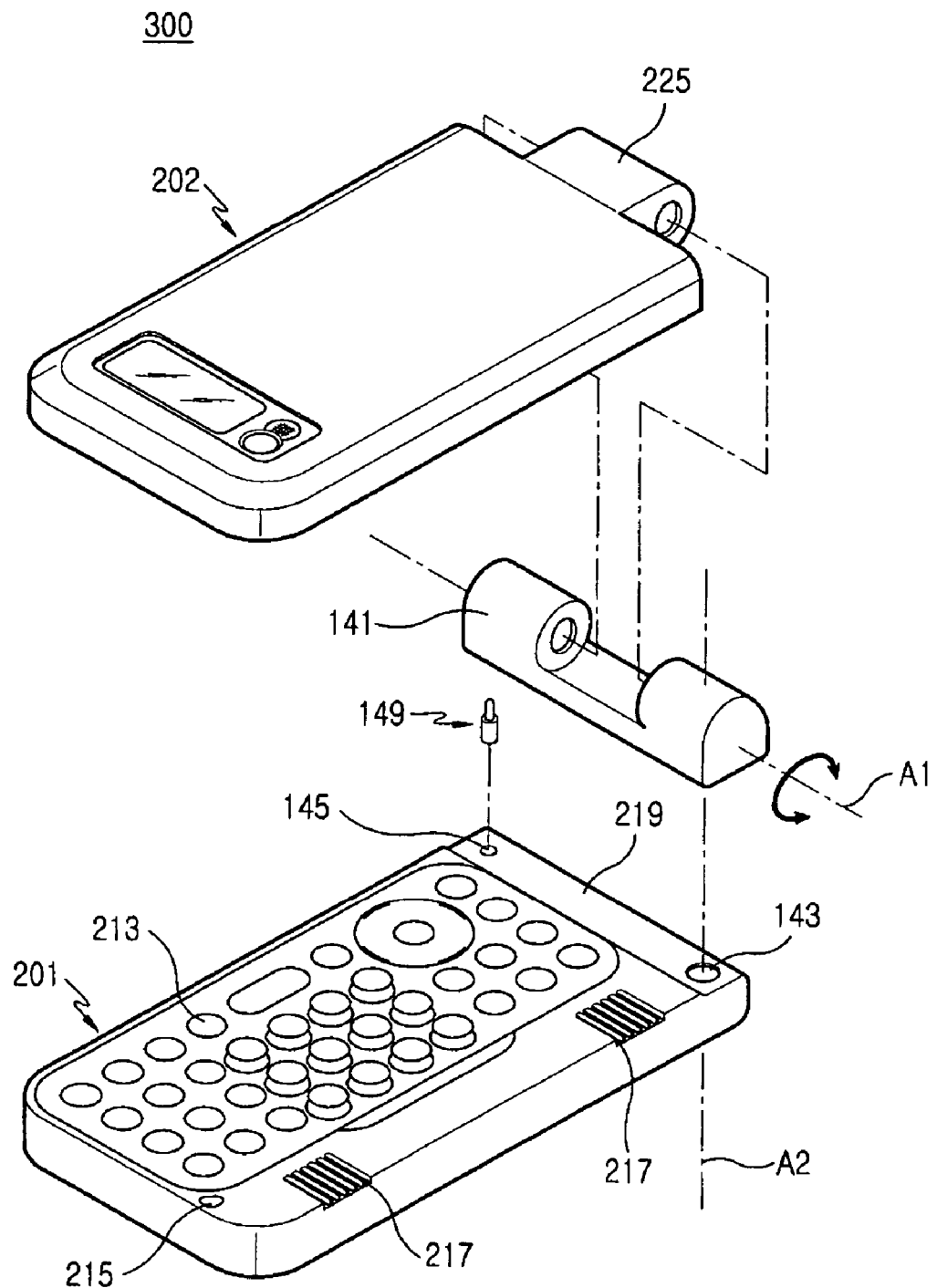
FIG. 9 is an exploded perspective view of a portable terminal including a rotation restrictor according to a second exemplary embodiment of the present invention.

As shown in FIGS. 6 through 8, the portable terminal 200 having the hinge apparatus 100 includes a first housing 201 and a second housing 202 that are connected by the hinge apparatus 100.

The first housing 201 includes a keypad region 211a, an audio equipment region 211b, and a resting groove 219 on one face. The first housing 201 also includes a transmitting unit 215 having a microphone embedded therein. A keypad 213 including a plurality of keys is mounted in the keypad region 211a. The keypad 213 may include 3×4 number/character input keys of general portable terminals, a menu search/selection key, a send key, and an end key. In the current exemplary embodiment of the present invention, the keypad 213 includes QWERTY input keys of general personal computers, a menu search/selection key, and function keys. It is preferable that numbers are assigned to some of the QWERTY input keys to perform a communication function such as call number input. The sound equipment region 211b is positioned at one end of the keypad region 211a. A pair of speaker devices 217 are mounted and spaced apart from each other in the sound equipment region 211b. The resting groove 219 is formed stepwise on a face of the first housing 201 to provide a space for the hinge apparatus 100, specifically, the third housing 104. When the third housing 104 is positioned on the resting groove 219, one end is rotatably connected with one end of the resting groove 219 and the pair of side hinge arms 141 protrude from a face of the first housing 201.

When the third housing 104 is positioned on the resting groove 219, the hinge apparatus 100 is as shown in FIG. 2. At this time, the protruding portion 155b is positioned on the curved surface between the lowest point L of one end of the first protruding 155a and the highest point H of the first mountain-shaped portion 155a. Thus, the third housing 104 remains positioned within the resting groove 219. When the hinge cap 103 rotates 180° from a position within the resting groove 219, the sleeve 131 is locked by the stopper rib 117, thereby restricting the rotation range of the hinge cap 103 within 180°.

The second housing 202 includes a center hinge arm 225 formed on its one end. The center hinge arm 225 is rotatably connected between the side hinge arms 141. In other words, the side hinge arms 141 rotatably support both sides of one end of the second housing 202, specifically both sides of the center hinge arm 225, thereby providing the first hinge axis A1. A display device 221 and a receiving unit 223 (or earpiece) are mounted in a face of the second housing 202 opposite to the first housing 201.

The hinge housing 101 of the hinge apparatus 100 is fixed to the inner side of an upper portion of the first housing 201 and its opened end protrudes on the resting groove 219. The hinge cap 103 is rotatably combined on the hinge housing 101 while being accommodated in the third housing 104, thereby rotating with respect to the second hinge axis A2. The second housing 202 is combined on the third housing 104, thereby rotating with respect to the first hinge axis A1 and the second axis A2.

As the second housing 202 rotates with respect to the first hinge axis A1, the second housing 202 rotates in a direction away from the first housing 201, thereby being opened. FIG. 7 is a front view showing the second housing 202 rotates with respect to the first hinge axis A1, thus being opened. When the second housing 202 rotates in a direction away from the first housing 201, a user can perform a general voice communication and a short message write/transmission operation using the portable terminal 200.

In FIG. 7, if the third housing 104 rotates with respect to the second hinge axis A2, the display device 221 is opened and the second housing 202 is positioned in parallel with one side of the first housing 201. At this time, when rotating 180° through the highest position H from a position near to the lowest point L of one end of the first protruding portion 155a, the second protruding portion 155b is positioned near to the lowest point L of the other end of the first protruding portion 155a and moves 180° along the curved surface of the first protruding portion 155a. The sleeve 131 is locked by the stopper rib 117, thereby restricting further rotation of the hinge cap 103, with respect to the second hinge axis A2.

Referring to FIG. 8, when the second housing 202 is positioned in parallel with one side of the first housing 201, a user can position the display device 221 horizontally by positioning the portable terminal 200 horizontally.

When the second housing 202 is positioned in parallel with one side of the first housing 201, the speaker devices 217 are covered by the second housing 202, but sound can be sufficiently provided to the user. In addition, when the display device 221 is positioned horizontally and the user watches a music video, more enhanced sound such as stereo sound can be provided to the user through the pair of speaker devices 217. The sound equipment region 211b may be formed stepwise with respect to the keypad region 211a to support an outer side face of the second housing 202.

As shown in FIGS. 9 through 12, a portable terminal 300 including a rotation restrictor according to a second exemplary embodiment of the present invention includes a first housing 201, a second housing 202 and a third housing 104 rotatably combined with the first housing 201, and a pogo pin 149 for temporarily restricting rotation of the third housing 104. The portable terminal 300 differs from the portable terminal 200 according to the first exemplary embodiment of the present invention in that it includes the pogo pin 149. Thus, common elements are given the same reference numerals, and a detailed description of the configuration of the common elements will not be repeated.

The portable terminal 300 includes a first hinge axis A1 and a second hinge axis A2. When the third housing 104 is positioned on the first housing 201 and the second housing 202 is folded onto the first housing 201, the first hinge axis A1 is positioned on one end of the first housing 201 and extends in the horizontal direction of the first housing 201. The second hinge axis A2 extends perpendicularly to a face of the first housing 201 and provides a rotation axis for the first hinge axis A1. In other words, the first hinge axis A1 intersects with the second hinge axis A2 and the first hinge axis A1 rotates with respect to the intersection point.

The second housing 202 is opened from or closed onto the first housing 201 through rotation with respect to the first hinge axis A1 and is positioned substantially parallel with one side of the first housing through rotation with respect to the second hinge axis A2.

A resting groove 219 is formed on a face of the first housing 201. The resting groove 219 is stepped with respect to a face where the keypad 213 is mounted, and provides a space for the third housing 104.

A rotation hole 143 with which the third housing 104 is rotatably combined and a fixing hole 145 for fixing the pogo pin 149 are formed on the resting groove 219. The pogo pin 149 has a compression spring embedded therein and is combined with the fixing hole 145. A first end of the pogo pin 149 is provided with an elastic force of the embedded compression spring to protrude from the resting groove 219. The second housing 202 includes a center hinge arm 225 at its one end.

The third housing 104 includes a pair of side hinge arms 141 and extends in the direction of the first hinge axis A1. A first end of the third housing 104 is rotatably combined with the first housing 201 through the rotation hole 143 of the resting groove 219 and one of the side hinge arms 141 is positioned on the second hinge axis A2. In other words, the third housing 104 rotates on the first housing 201 with respect to the second hinge axis A2. Through rotation with respect to the second hinge axis A2, at least a portion of the third housing 104 is separated from the first housing 201.

An engaging groove (see 147 of FIG. 11) is formed in the bottom surface of the other (second) end of the third housing 104. When the third housing 104 is positioned on the resting groove 119, the pogo pin 149 is engaged in the engaging groove 147. Thus, to separate the third housing 104 from the resting groove 219, an external force that is sufficiently large for the pogo pin 149 to be separated from the engaging groove 147 should be applied.

Figure 10:
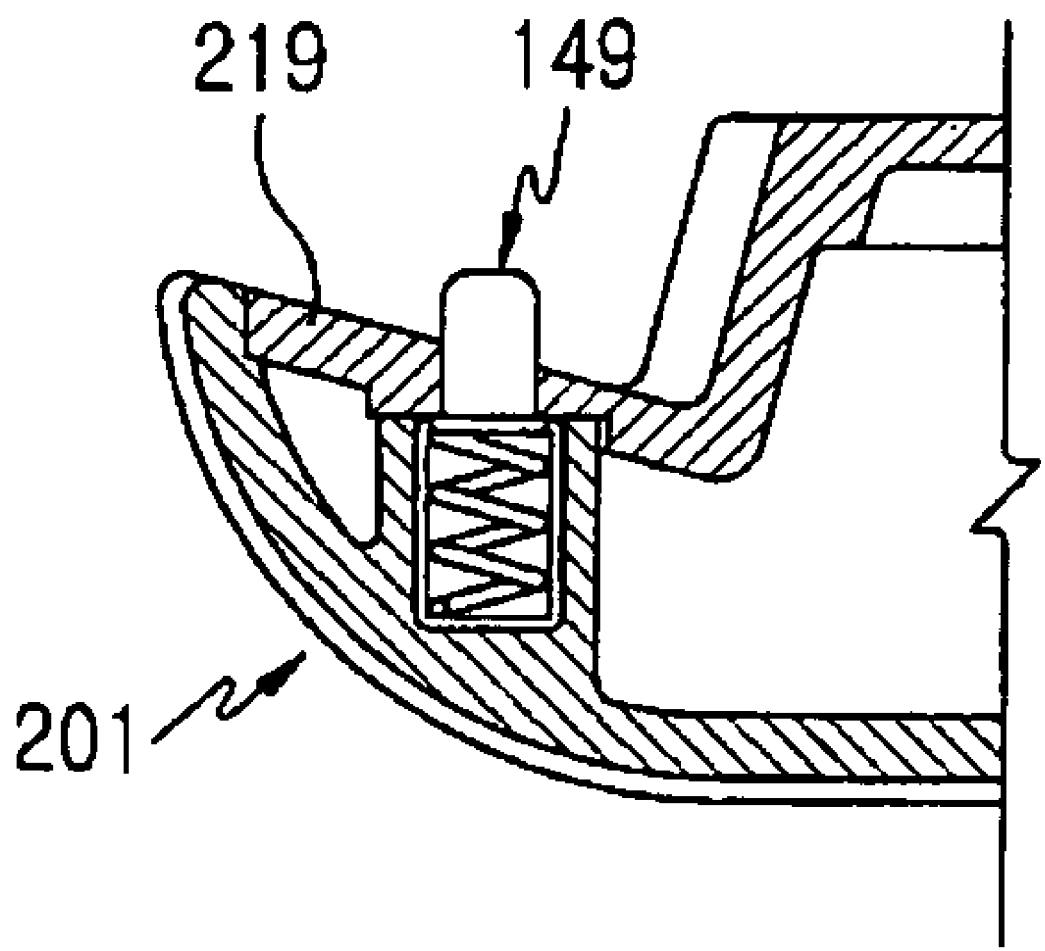
FIG. 10 is a cross-sectional view showing a pogo pin of the portable terminal of FIG. 9 assembled into a first housing.
Figure 11:
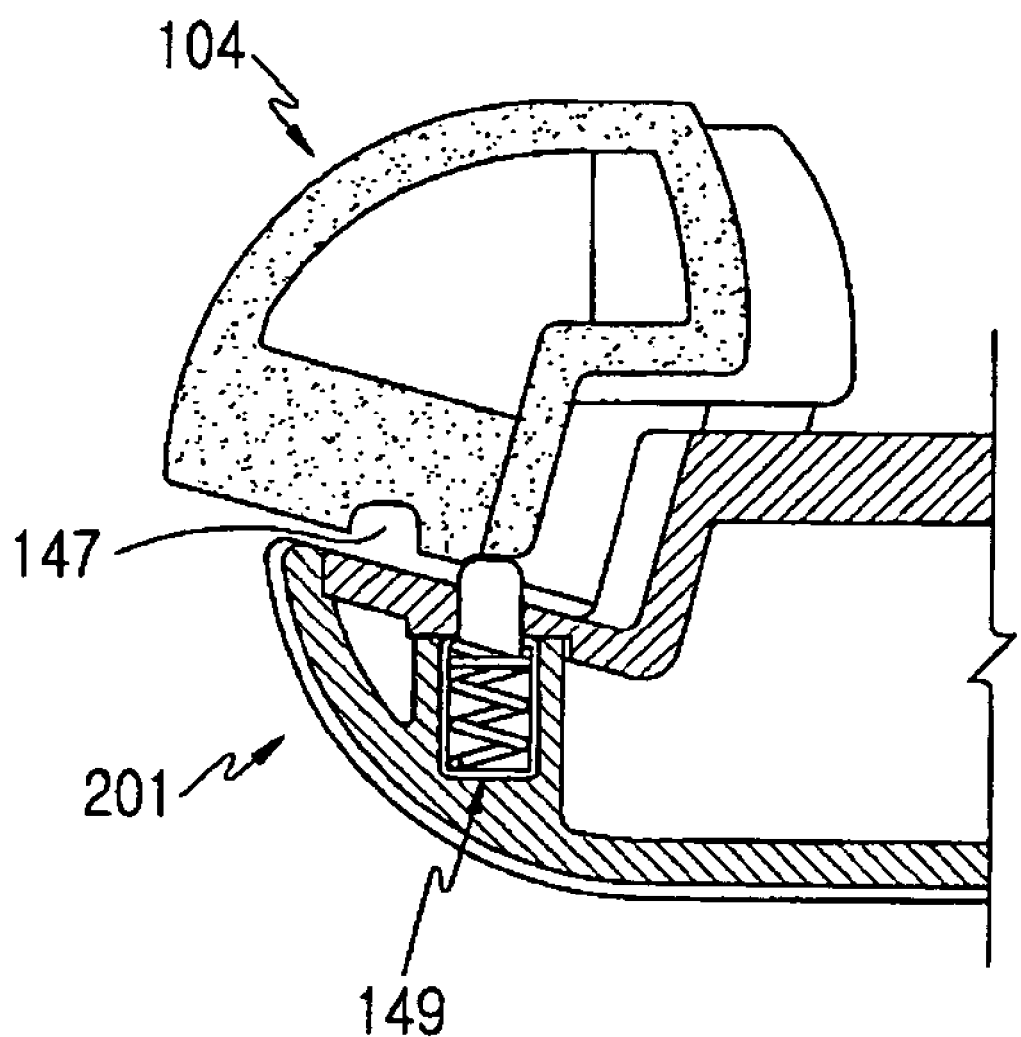
FIG. 11 is a cross-sectional view showing an operation for positioning a third housing of the portable terminal of FIG. 9 on the first housing.
Figure 12:
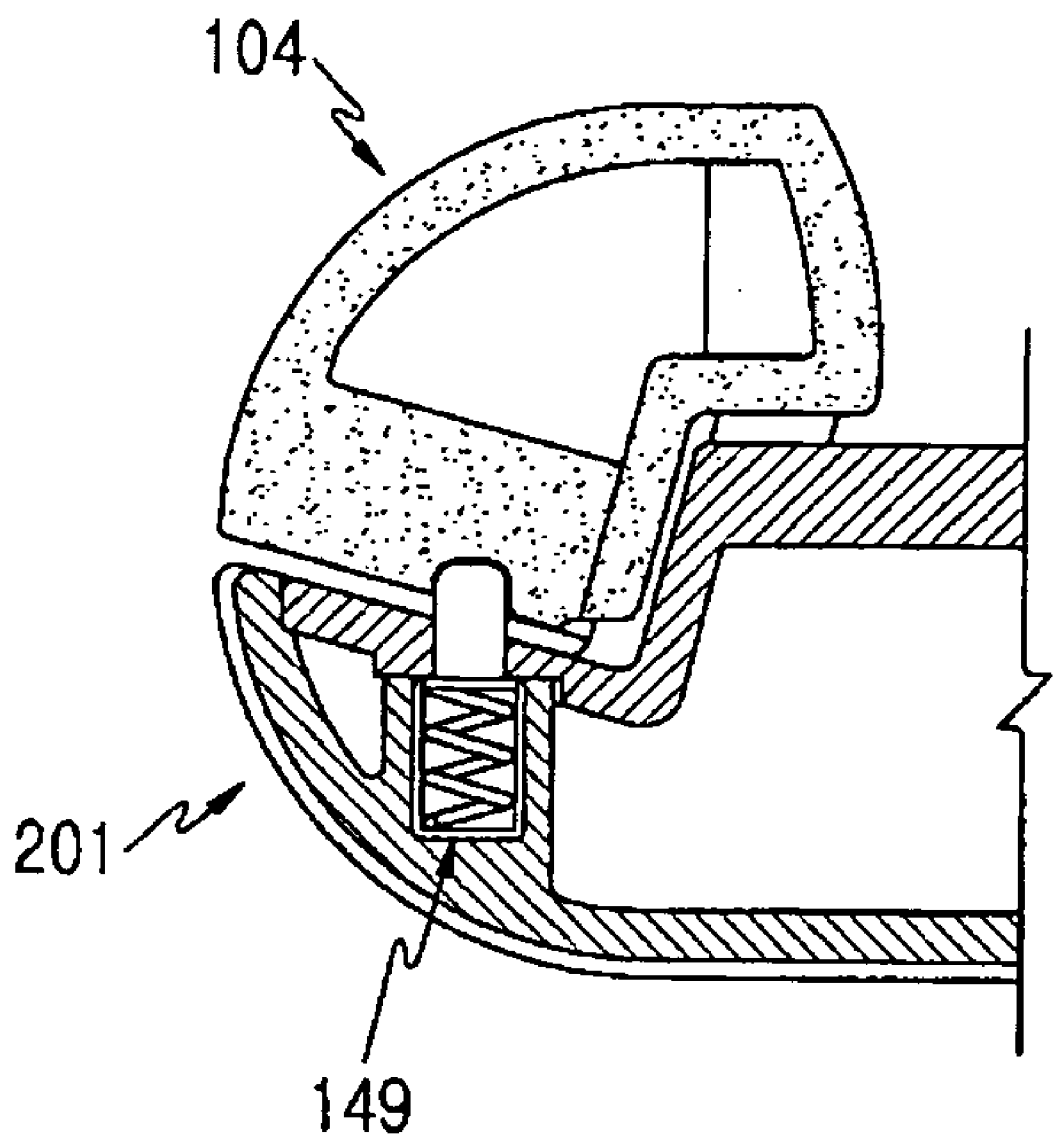
FIG. 12 is a cross-sectional view showing a state where the third housing of the portable terminal of FIG. 9 is positioned on the first housing.

FIGS. 10 through 12 illustrate a sequential process in which the third housing 104 enters the resting groove 219.

When the third housing 104 is separated from the resting groove 219, the first end of the pogo pin 149 protrudes from the resting groove 219. When the third housing 104 enters the resting groove 219, the bottom surface of the third housing 104 interferes with the first end of the pogo pin 149 and thus, the first end of the pogo pin 149 is pushed down. Once the third housing 104 completely enters the resting grove 219 and the engaging groove 147 faces the first end of the pogo pin 149, the first end of the pogo pin 149 is engaged in the engaging groove 147.

A guide groove (not shown) may be formed along the locus of movement of the pogo pin 149 on the bottom surface of the third housing 104. From the instant at which the third housing 104 enters the resting groove 219 and interferes with the first end of the pogo pin 149, an inner wall of the guide groove starts to press the first end of the pogo pin 149. Thus, the first end of the pogo pin 149 is withdrawn toward the resting groove 219.

When the third housing 104 is positioned on the resting groove 219 and the second housing 202 is folded onto the first housing 201, if a user desires to open the portable terminal 300 by rotating the second housing 202 with respect to the first hinge axis A1, the pogo pin 149 is engaged in the engaging groove 147, thereby restricting movement of the third housing 104. Thus, opening/closing through rotation of the second housing 202 with respect to the first hinge axis A1 can be implemented stably without movement of the third housing 104.

As described above, according to the exemplary embodiments of the present invention, a pair of housings can rotate with respect to two axes and a user can use a horizontal-view function if necessary when a housing is positioned in parallel with one side of the other housing. Thus, a user can conveniently watch a screen provided through a multimedia service. Moreover, in a horizontal-view state, since the pair of housings are separately positioned in the lower and upper sides, the user can conveniently use a keypad mounted in the housing of the lower side. In addition, when one housing rotates to a horizontal-view position, it can rotate with a driving force provided by a hinge apparatus, thereby conveniently rotating a portable terminal.

Moreover, through a pogo pin on a first housing and an engaging groove engaged with the pogo pin on a third housing, movement of the third housing can be restricted during rotation of a second housing with respect to a first hinge axis, thereby stably implementing rotation of the second housing.

While the invention has been shown and described with reference to certain embodiments thereof, it will be understood by those skilled in the art that various changes in form and details may be made therein without departing from the spirit and scope of the invention as defined by the appended claims.

What is claimed is:

1. A portable terminal comprising;
   a first housing;
   a second housing rotating in a direction toward or away from the first housing with respect to a first hinge axis and rotating with respect to a second hinge axis, which extends perpendicularly to the first hinge axis; and
   a hinge apparatus comprising a third housing, which is rotatably coupled to the first housing and rotates with respect to the second hinge axis on the first housing, the hinge apparatus connects the first housing and the second housing,
   wherein the second hinge axis extends perpendicularly to a face of the first housing and provides a rotation axis for the first hinge axis; and
   the second housing is rotatably coupled to the third housing while rotating with respect to the first hinge axis and rotates with the third housing with respect to the second hinge axis, further comprising: a pair of side hinge arms formed at both ends of the third housing; and a center hinge arm formed at one end of the second housing and rotatably combined between the side hinge arms.

2. The portable terminal of claim 1, the hinge apparatus further comprising:
a hinge housing fixed on the first housing which extends in the direction of the second hinge axis;
a hinge shaft connected with the hinge housing which extends in the direction of the second hinge axis and which rotates with respect to the second hinge axis; and
a hinge cap positioned on the hinge shaft to rotate with respect to the second hinge axis,
wherein the third housing surrounds at least a portion of the hinge housing and the hinge cap which rotates with respect to the second hinge axis along with the hinge cap.

3. The portable terminal of claim 2, wherein the second housing is connected with the third housing and rotates with respect to the first hinge axis, and the second housing is positioned in parallel with one side of the first housing as the third housing rotates with respect to the second hinge axis when the second housing rotates in the direction away from the first housing.

4. The portable terminal of claim 2, wherein the hinge cap is provided to close one end of the hinge housing and surround a portion of an outer circumferential face of the hinge housing.

5. The portable terminal of claim 4, further comprising an engaging arm extending from an outer circumferential face of the hinge cap in the direction of the first hinge axis.

6. The portable terminal of claim 4, further comprising an engaging arm extending from an outer circumferential face of the hinge cap in the direction of the first hinge axis and fixed within the third housing.

7. The portable terminal of claim 2, further comprising at least one engaging arm extending from an outer circumferential face of the other end of the hinge housing and fixed within the first housing.

8. The portable terminal of claim 2, wherein the hinge cap is positioned on the hinge shaft by a screw that penetrates the hinge cap from the top of the hinge cap and is screwed in an end of the hinge shaft.

9. The portable terminal of claim 2, further comprising:
a stopper rib protruding from an outer circumferential face of the hinge housing; and
a sleeve provided on the hinge cap to surround a portion of the outer circumferential face of the hinge housing,
wherein as the hinge cap rotates with respect to the second hinge axis, the sleeve is locked by the stopper rib, thereby restricting the rotation range of the hinge cap.

10. The portable terminal of claim 2, further comprising:
a hinge dummy provided on an outer circumferential face of the hinge cap which extends in the direction of the first hinge axis; and
a pair of hinge arms formed at both ends of the third housing,
wherein the hinge dummy is exposed to an inner wall of one of the side hinge arms.

11. The portable terminal of claim 2, further comprising:
a first hinge cam fixed on the hinge shaft which rotates along with the hinge shaft;
a second hinge cam opposite to the first hinge cam and rotatably connected on the hinge shaft; and
an elastic member positioned on the hinge shaft to provide an elastic force exerted in a direction the second hinge cam is attached to the first hinge cam.

12. The portable terminal of claim 11, wherein the elastic member, the second hinge cam, and the first hinge cam are sequentially accommodated in the hinge housing, one end of the elastic member is supported by a wall of one end of the hinge housing, and the other end of the elastic member is supported by the second hinge cam, thereby providing an elastic force.

13. The portable terminal of claim 12, further comprising:
at least one guide groove extending in the direction of the second hinge axis and formed in an inner circumferential face of the hinge housing; and
a guide protrusion protruding from an outer circumferential face of the hinge housing and engaged in the guide groove to move along a straight line,
wherein the second hinge cam reciprocates along a straight line within the hinge housing.

14. The portable terminal of claim 11, further comprising:
at least one first protruding portion formed in the first hinge cam; and
at least one second protruding portion formed in the second hinge cam,
wherein as the first hinge cam rotates along with the hinge shaft, the second protruding portion moves from a lowest point of one end of the first protruding portion to the lowest point of the other end of the first protruding portion through a highest point of the first protruding portion along a curved surface of the first protruding portion.

15. The portable terminal of claim 14, wherein the hinge shaft rotates about 180° or more while the second protruding portion moves from a lowest point of one end of the first protruding portion to the lowest point of the other end of the first protruding portion through the highest point of the first protruding portion along the curved surface of the first protruding portion.

16. The portable terminal of claim 14, further comprising:
a stopper rib protruding from an outer circumferential face of the hinge housing; and
a sleeve provided on the hinge cap to surround a portion of the outer circumferential face of the hinge housing,
wherein as the hinge cap rotates with respect to the second hinge axis, the sleeve is locked by the stopper rib, thereby restricting the rotation range of the hinge cap.

17. The portable terminal of claim 16, wherein the second protruding portion is positioned on a curved surface of the first protruding portion between a substantially highest point and the substantially lowest point of the other end of the first protruding portion when the sleeve is locked by the stopper rib.

18. The portable terminal of claim 2, wherein the hinge housing is substantially cylindrical in shape and includes one opened end and another end which is closed, and the hinge shaft is rotatably connected with a wall of the other end of the hinge housing through the hinge housing in the direction of the second hinge axis.

19. The portable terminal of claim 18, wherein one end of the hinge shaft protrudes to the outside of the other end of the hinge housing and an E-ring is engaged in an outer circumferential face of the hinge shaft.

20. The portable terminal of claim 19, further comprising:
a hinge dummy provided on an outer circumferential face of the hinge cap which extends in the direction of the first hinge axis; and
a slit formed through an inner circumferential face and an outer circumferential face of a sleeve,
wherein an end of the slit extends to an inside of the hinge dummy.

21. The portable terminal of claim 2, further comprising a sleeve provided on the hinge cap to surround a portion of an outer circumferential face of the hinge housing, wherein an inner circumferential face of the sleeve and the outer circumferential face of the hinge housing are spaced apart by a predetermined interval.

22. The portable terminal of claim 1, wherein the third housing extends in the direction of the first hinge axis.

23. The portable terminal of claim 1, wherein the pair of side hinge arms are positioned on the first hinge axis.

24. The portable terminal of claim 1, wherein the third housing is positioned at one end of the first housing and the side hinge arms protrude from a face of the first housing.

25. The portable terminal of claim 1, wherein one end of the third housing is combined with one end of a face of the first housing and rotates with respect to the second hinge axis.

26. The portable terminal of claim 1, further:
a resting groove formed in a face of the first housing;
wherein the third housing extends in the direction of the first hinge axis; and
one end of the third housing is connected with the first housing and rotates with respect to the second hinge axis, and as the third housing rotates with respect to the second hinge axis when the second housing rotates in the direction away from the first housing, the second housing is positioned in parallel with one side of the first housing.

27. The portable terminal of claim 26, wherein the resting groove is positioned in one end of the first housing and extends in a direction.

28. The portable terminal of claim 26, further comprising a pair of speaker devices provided in a side of the first housing, wherein the speaker devices are covered by the second housing when the second housing is positioned in parallel with a side of the first housing.

29. The portable terminal of claim 26, wherein a keypad region and a sound equipment region are provided in a face of the first housing and are formed stepwise with respect to each other.

30. The portable terminal of claim 26, further comprising:
a center hinge arm formed at one end of the second housing; and
a pair of side hinge arms formed at both ends of the third housing to rotatably support the center hinge arm.

31. The portable terminal of claim 30, wherein the side hinge arms protrude from a face of the first housing when the third housing is positioned in the resting groove.

32. The portable terminal of claim 26, further comprising:
a pogo pin fixed in the resting groove, the pogo pin having a first end that protrudes from the resting groove; and
an engaging groove formed in a face of the third housing, wherein when the third housing is positioned on the resting groove, the first end of the pogo pin is engaged in the engaging groove to restrict rotation of the third housing.

33. The portable terminal of claim 32, wherein an engaging groove is formed on the third housing, and when the third housing is positioned on the resting groove, the first end of the pogo pin is engaged in the engaging groove to restrict rotation of the third housing.

34. The portable terminal of claim 33, wherein the second housing is connected with the third housing and rotates with respect to the first hinge axis, and when the third housing rotates with respect to the second hinge axis while the second hinge housing rotates in the direction of moving away from the first housing, one end of the pogo pin separates from the engaging groove, thereby positioning the second housing substantially parallel with one side of the first housing.

35. The portable terminal of claim 33, wherein the third housing extends in the direction of the first hinge axis.

36. The portable terminal of claim 33, further comprising:
a pair of side hinge arms formed at both ends of the third housing; and
a center hinge arm formed in one end of the third housing and rotatably combined between the side hinge arms.

37. The portable terminal of claim 36, wherein the pair of side hinge arms are positioned on the first hinge axis.

38. The portable terminal of claim 36, wherein the third housing is positioned at one end of the first housing and the side hinge arms protrude from a face of the first housing.

39. The portable terminal of claim 36, wherein one of the side hinge arms is positioned on the second hinge axis.

40. The portable terminal of claim 32, further comprising an engaging groove formed in a face of the third housing, wherein when the third housing is positioned on the resting groove, it is separated from the first housing through rotation with respect to the second hinge axis.

* * * * *